UNITED STATES PATENT OFFICE.

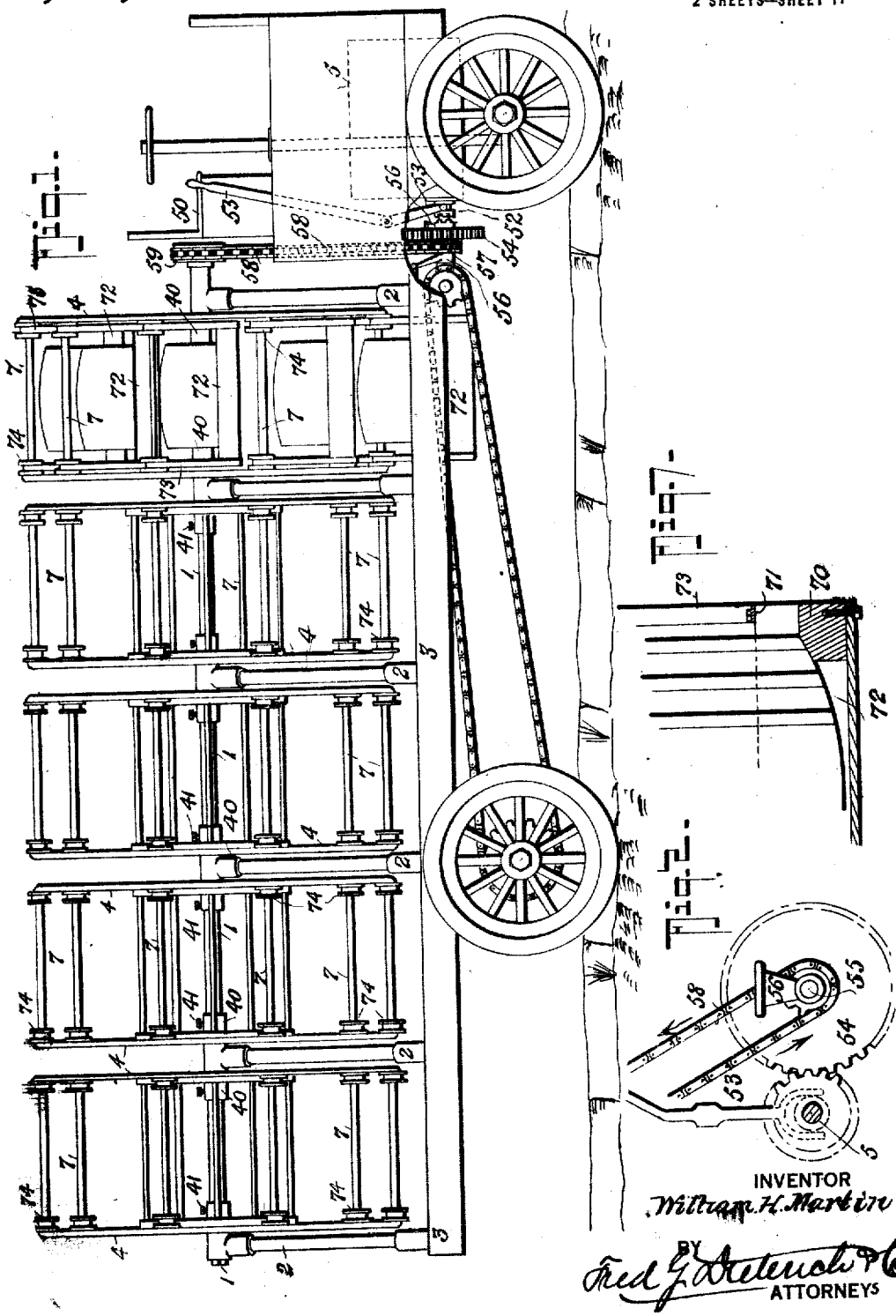

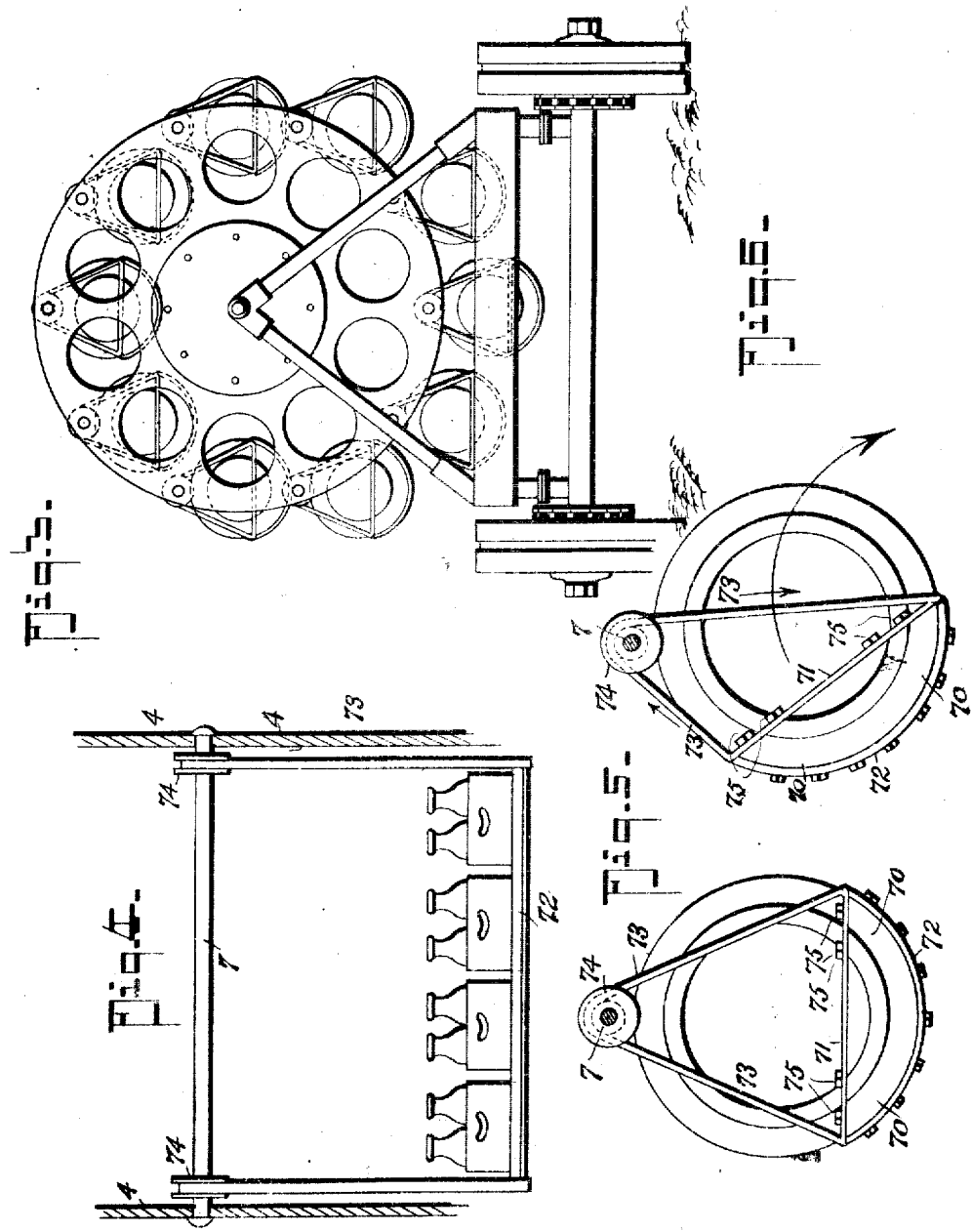

WILLIAM H. MARTIN, OF VETERANS HOME, CALIFORNIA, ASSIGNOR OF ONE-HALF TO SEBA E. BELKNAPP, OF VETERANS HOME, CALIFORNIA.

REVOLVING SUSPENSION-RACK.

1,261,837. Specification of Letters Patent. Patented Apr. 9, 1918.

Application filed November 23, 1917. Serial No. 203,578.

*To all whom it may concern:*

Be it known that I, WILLIAM H. MARTIN, residing at Veterans Home, county of Napa, and State of California, have invented certain new and useful Improvements in Revolving Suspension-Racks, of which the following is a specification.

This invention has reference to that class of suspension racks in which is included racks or cradles revolubly mounted upon a motor truck and adapted for holding heavy kegs, casks and the like in suspension during transporting or carting the same and in such manner that they are held from rolling off the truck as they are being conveyed and in which the racks or cradles can be readily adjusted to turn to a position for discharging the casks or barrels onto skids or other like runways, attachable to the sides of the truck when unloading.

Among other objects, my invention has for its purpose to provide an improved revolving suspension rack of the character stated in which is included a plurality of racks mounted upon and adapted for coöperating with a supporting shaft, and means convenient to the truck driver's seat for coupling up the said shaft with the motor engine.

Again, my invention has for its object the provision, in a suspension rack of the character stated, of an improved construction of crates or cradles that form a part of the revoluble racks and so held in suspension that when the rack has been guided to the desired position, by the motor power, for discharging, the said cradle can be freely swung by the operator to roll off the barrel or cask over that side of the motor truck at which the particular cradle to be unloaded has been moved to the discharging point.

With other objects in view that will hereinafter be fully explained, the invention resides in those novel features of construction, combination and arrangement of parts, all of which will be first fully described, specifically pointed out in the appended claims and illustrated in the accompanying drawings, in which:—

Figure 1 is a side elevation of a motor truck equipped with my improved revolving suspension rack mechanism.

Fig. 2 is a detail view of the clutch gear devices for connecting the engine shaft and the gear carrying shaft driving gear.

Fig. 3 is an end elevation of the truck, one of the revolving racks being shown mounted thereon and in the operative position.

Fig. 4 is a side elevation of one of the cradles hereinafter specifically referred to.

Fig. 5 is an end elevation thereof, the same being shown at the normal position.

Fig. 6 is an end view thereof the same being shown at the barrel discharging position.

Fig. 7 is a detail section of one end of the said cradle.

In my present construction of revolving suspension rack the same is constructed and arranged for carrying a large load or number of heavy kegs, casks and other bodies capable of being "rolled" during the act of discharging from the rack and in the drawings (Fig. 1) I have shown five of such racks, one of which is illustrated as fully loaded with beer barrels, the others shown empty to the better illustrate the structural features of the cradles that form an essential part of the invention.

In the present construction, a single shaft or reach member 1, is provided that is horizontally mounted in standards 2—2 fixed on and extending vertically from the truck frame 3, the said shaft being shown positioned relatively to the truck frame 3 with the cradle or barrel supporting members that form a part of the racks, presently referred to, when brought down into position for loading and unloading substantially as low as the said frame, see Fig. 3, for facilitating the placing of the barrels onto or rolling them off the said cradles.

Each revolving rack is in the nature of a wheel composed of two end disks 4—4 of a large diameter, preferably six feet when the rack is provided for carrying the very heavy kegs or casks, and the said disks 4—4 are perforated so as to reduce their weight and it has a hub 40 for receiving a set screw 41 that fixes the said wheels to the shaft 1 so that in turning the said shaft by motor power, as presently explained, all of the several cradles will be coöperative with the shaft 1.

5 designates the motor engine, preferably located on the front end of the truck frame, (see Fig. 1) and adjacent the driver's seat 50 and the shaft 51 of the said engine carries a clutch gear 52 slidable by the shifting lever 53 for being moved into and out of mesh with a driven gear 54 mounted on a stub shaft 55 held in brackets 56—56 and having a grooved hub 57 for receiving the belt or chain 58 that takes over the chain wheel 59 on the rack or cradle carrying shaft 1, as is clearly shown in Fig. 1.

Motor shaft 51 is also coupled in the usual manner with the rear truck axle 6 for driving the machine.

By reason of providing a clutch gear connection coöperating with the engine shaft and slidable as shown and described, the operator, by manipulating the end lever can readily put the revolving rack devices into gear with the engine shaft to bring the racks to the desired position for unloading, it being understood that when the engine is to be used for such purposes, the motor is cut out from the truck which now forms a solid base or support onto which and from which the heavy casks or barrels may be readily rolled to discharge over the opposite sides thereof.

As before stated, each revolving rack includes two end disks having hubs for fixing them onto the shaft 1 and in the present structure, the disks are joined by a series of cross or distance rods 7 that connect with their disks at their peripheral edges and the several rods 7 form the supports on which the cradles are swingably suspended and to support the barrels or kegs below the disks 4—4 as they pass down to the unloading position indicated by X in Fig. 3.

The cradles or crates each comprise a concaved sheet metal receiver, in the nature of a trough 72 that is of sufficient depth, relatively to the kegs to be held thereon, to extend far enough over the sides of the keg to hold the same from rolling out of the cradle as it is held in suspension during the transporting and as it is being lowered to the keg discharging position.

The trough-like body 72 is made of heavy sheet metal and at the ends it has concaved filler blocks 70 of wood that form bearing members on which the ends of the barrel rest.

The trough 72 is swingably suspended on distance rods 7 by flexible metal hangers 73 connected to the trough and which take over sheaves 74 on rod 7, as best shown in Figs. 5 and 6, by reference to which it will be also noticed that the ends of the trough are strengthened by having the hangers include portions 71 joined to the upper edges of the trough ends by bolts 75—75.

By reason of the peculiar construction and arrangement of the parts as shown and described, any one of the barrels may be easily removed without interfering with the other when the cradle from the barrel to be discharged is brought down to the discharging point X by the motor power, it being understood that when thus positioned, the under set of racks are held stationary by reason of the motor power being cut out and when thus held the operator, by pushing back the cradle to swing it to the position shown in Fig. 6 allows the barrel to roll out as indicated by the arrow.

By making the body of the cradle in the nature of a sheet metal trough and providing the same with fillers of wood the weight of the keg on the bulged portion of the cradle is taken off and the entire weight of the barrel is transferred on the filler blocks in the ends of the cradle and such holding of the kegs helps to easily roll them out of the cradles when the latter are positioned as in Fig. 6.

What I claim is:—

1. In a means for carting heavy kegs, barrels, and the like, a platform, standards on the platform, a horizontal shaft journaled in the said standards, a rack fixedly mounted upon the said horizontal shaft, the said rack comprising end disks, distance rods that join the said disks and located at the periphery of said disks, cradles, devices for swingably suspending said cradles, one from each of the distance rods, said cradle suspending means including shiftable hangers whereby the cradle can swing with said rod as a center and rock with the barrel axis as a center, the diameter of the disks and the positioning of the cradle being relatively such with respect to the platform that the said cradles when guided into position for unloading, are just above the platform, to provide for rolling the barrels sidewise over the side edges of the said platform.

2. In a means for carting heavy kegs, barrels, and the like, a platform, standards on the platform, a horizontal shaft journaled in the standards, a rack fixedly mounted on the shaft, said rack comprising end disks, distance rods that join the said end disks, and which are located at the peripheral edges of the said disks, a pair of sheaves on each distance rod, a cradle suspended from each of the said distance rods, said cradles consisting of trough like bodies for receiving the barrels and including flexible metal hangers that take over the sheaves of the distance rods, and whose lower ends are secured to the upper edges of the ends of the trough-like body.

3. In a means for carting heavy kegs, barrels, and the like, a platform, standards on the platform, a horizontal shaft that extends lengthwise of the platform, and is journaled in the said standards, a rack fixedly mounted on the shaft and comprising end disks, distance rods that join the said end disks located at the peripheral edges of the said disks, a sheave mounted on each end of each of the distance rods, a cradle for each distance rod, each of the cradles consisting of a sheet metal trough like body open at the ends, a wooden filler block in each end of the said blocks having a concave seat that form rests for the ends of the barrels or kegs supported by the cradles, a flexible metal hanger pendently supported from each of the sheaves on the distance rods and whose ends extend across the upper edge of the ends of the filler portions of the trough.

4. In a loading and unloading means of the character stated, a barrel holding cradle consisting of a supporting rod, a pair of sheaves mounted one on each end of the said rod, a cradle consisting of a trough-like body, and a flexible hanger pendently supported from each of the said sheaves, said hanger including portions secured flatwise on the upper edges of the trough-like body.

WILLIAM H. MARTIN.